US010262303B2

(12) United States Patent
Powell

(10) Patent No.: US 10,262,303 B2
(45) Date of Patent: Apr. 16, 2019

(54) METHODS AND SYSTEMS FOR APPLYING A REWARDS PROGRAM PROMOTION TO PAYMENT TRANSACTIONS

(75) Inventor: Jonathan Robert Powell, Rye Brook, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1362 days.

(21) Appl. No.: 11/966,803

(22) Filed: Dec. 28, 2007

(65) Prior Publication Data

US 2009/0171778 A1 Jul. 2, 2009

(51) Int. Cl.
| | |
|---|---|
| *G06Q 30/02* | (2012.01) |
| *G06Q 20/02* | (2012.01) |
| *G06Q 20/12* | (2012.01) |
| *G06Q 20/38* | (2012.01) |
| *G06Q 20/40* | (2012.01) |
| *G06Q 40/00* | (2012.01) |

(52) U.S. Cl.
CPC ............ *G06Q 20/02* (2013.01); *G06Q 20/12* (2013.01); *G06Q 20/387* (2013.01); *G06Q 20/40* (2013.01); *G06Q 30/02* (2013.01); *G06Q 30/0207* (2013.01); *G06Q 30/0236* (2013.01); *G06Q 40/12* (2013.12)

(58) Field of Classification Search
CPC ..... G06Q 30/00; G06Q 30/0233; G06Q 30/02
USPC ............ 705/14, 14.27, 41, 26, 14.31, 14.17; 235/375, 380
See application file for complete search history.

(56) References Cited

U.S. PATENT DOCUMENTS

| 6,049,778 A | 4/2000 | Walker et al. |
| 6,594,640 B1 * | 7/2003 | Postrel ...................... 705/14.27 |
| 6,671,358 B1 | 12/2003 | Seidman et al. |

(Continued)

FOREIGN PATENT DOCUMENTS

WO 2007092789 A3 8/2007

OTHER PUBLICATIONS

International Search Report; PCT/US2008/80427; dated Dec. 10, 2008; 3 pages.

(Continued)

*Primary Examiner* — Marilyn G Macasiano
(74) *Attorney, Agent, or Firm* — Armstrong Teasdale LLP

(57) ABSTRACT

A method for applying promotion codes to a payment transaction using an input device in communication with a database is provided. The payment transaction includes a purchase made by a cardholder using a payment card over a payment card network. The method includes storing promotion data within the database including at least one promotional program having a qualifying number of rewards points for a rewards program, and storing rewards data within the database including a current number of rewards points accumulated by the cardholder. The method further includes providing access to the promotion data through the at least one input device including each promotional program having a qualifying number of rewards points that is less than the current number of rewards points for the cardholder, receiving a selected promotional program from the cardholder, and automatically applying the promotion codes associated with the selected promotional program to the payment transaction.

26 Claims, 9 Drawing Sheets

(56) References Cited

U.S. PATENT DOCUMENTS

| | | | |
|---|---|---|---|
| 7,103,573 | B2 | 9/2006 | Mobed et al. |
| 7,308,254 | B1 | 12/2007 | Rissanen |
| 7,392,224 | B1* | 6/2008 | Bauer et al. .................... 705/41 |
| 7,857,210 | B2* | 12/2010 | Tietzen et al. ................ 235/380 |
| 7,934,639 | B1* | 5/2011 | Chen et al. .................... 235/375 |
| 2002/0133400 | A1 | 9/2002 | Terry et al. |
| 2004/0122736 | A1* | 6/2004 | Strock .................... G06Q 30/02 |
| | | | 705/14.31 |
| 2004/0238622 | A1 | 12/2004 | Freiberg |
| 2005/0197904 | A1 | 9/2005 | Baron et al. |
| 2005/0267812 | A1* | 12/2005 | Jensen et al. .................... 705/26 |
| 2006/0011719 | A1* | 1/2006 | Lehtonen et al. ............ 235/380 |
| 2006/0053056 | A1* | 3/2006 | Alspach-Goss ........ G06Q 20/10 |
| | | | 705/14.17 |
| 2006/0259364 | A1* | 11/2006 | Strock et al. .................... 705/14 |
| 2007/0100691 | A1* | 5/2007 | Patterson ........................ 705/14 |
| 2007/0150411 | A1 | 6/2007 | Addepalli et al. |
| 2007/0174120 | A1* | 7/2007 | Asmar et al. .................... 705/14 |
| 2007/0267479 | A1 | 11/2007 | Nix et al. |
| 2008/0005018 | A1 | 1/2008 | Powell |
| 2008/0120155 | A1* | 5/2008 | Pliha ...................... G06Q 20/10 |
| | | | 705/14.17 |
| 2008/0133339 | A1* | 6/2008 | Drakoulis et al. .............. 705/14 |
| 2008/0133351 | A1* | 6/2008 | White .................. G06Q 20/387 |
| | | | 705/14.27 |

OTHER PUBLICATIONS

Written Opinion of the International Searching Authority, PCT/US2008/80427 ; dated Dec. 10, 2008; 7 pages.

PCT/US2008/080482 Preliminary Report on Patentability dated Jul. 8, 2010, 12 pages.

PCT/US2008/080482 Written Opinion of the International Searching Authority dated Jan. 7, 2009, 10 pages.

PCT/US2008/080482 International Search Report dated Jan. 7, 2009, 2 pages.

PCT/US2008/080427 Preliminary Report on Patentability dated Jul. 8, 2010, 9 pages.

U.S. Appl. No. 11/966,724 Office Action dated Nov. 12, 2010, 26 pages.

* cited by examiner

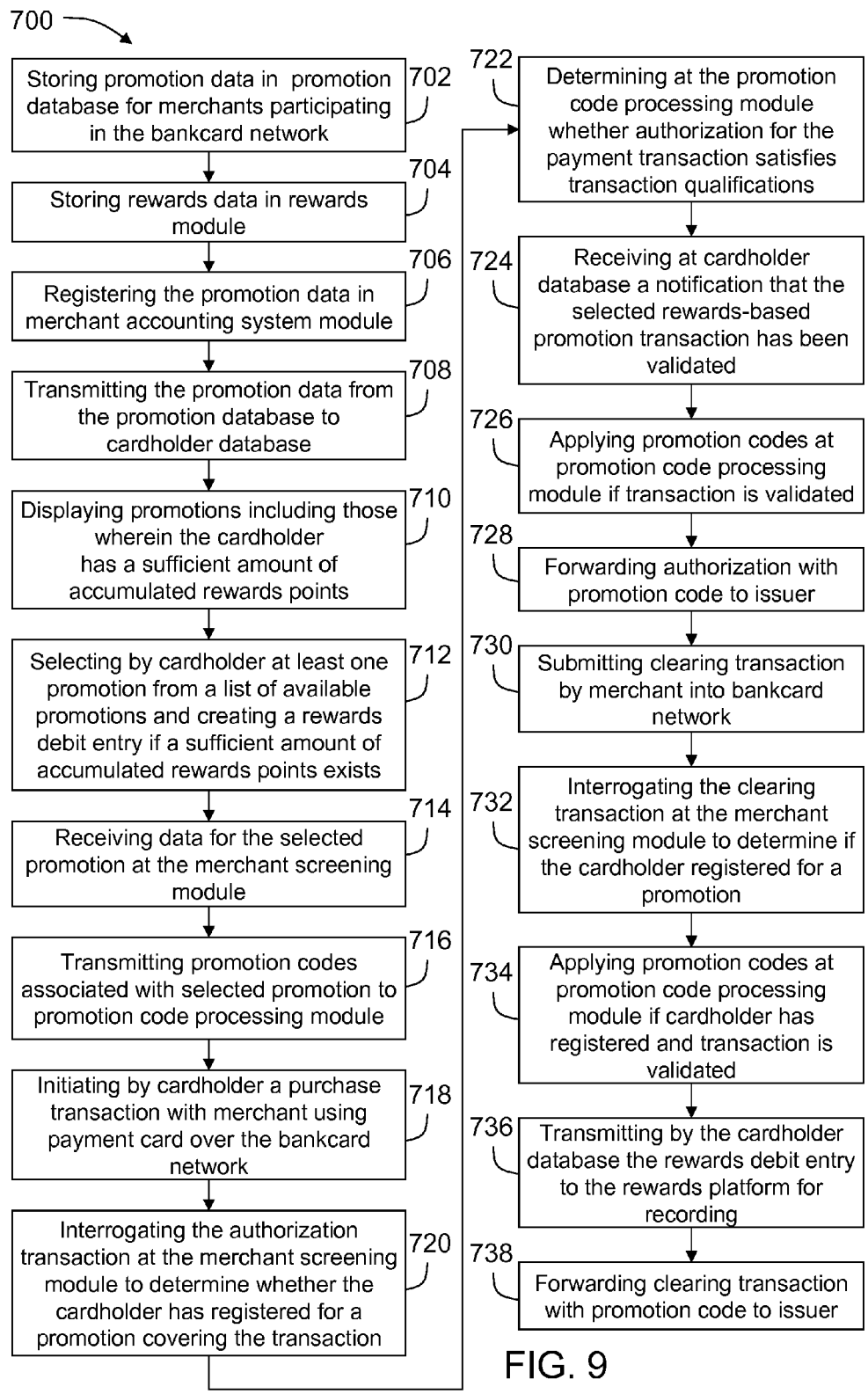

METHODS AND SYSTEMS FOR APPLYING A REWARDS PROGRAM PROMOTION TO PAYMENT TRANSACTIONS

BACKGROUND OF THE INVENTION

This invention relates generally to applying a rewards program promotion to payment transactions and, more particularly, to network-based methods and systems for enabling an account holder to select a rewards program promotion offered by a merchant, and applying promotion codes associated with the rewards program promotion to a payment transaction between the merchant and the account holder using a bankcard network.

Historically, the use of "charge" cards for consumer transaction payments was at most regional and based on relationships between local credit issuing banks and various local merchants. The payment card industry has since evolved with the issuing banks forming associations (e.g., MasterCard®) and involving third party transaction processing companies (e.g., "merchant acquirers") to enable cardholders to widely use charge cards at any merchant's establishment, regardless of the merchant's banking relationship with the card issuer.

For example, FIG. 1 of the present application shows an exemplary multi-party payment card industry system for enabling payment-by-card transactions in which the merchants and issuer do not need to have a one-to-one special relationship. Yet, various scenarios exist in the payment-by-card industry today, where the card issuer has a special or customized relationship with a specific merchant, or group of merchants. These special or customized relationships may, for example, include private label programs, co-brand programs, proprietary card brands, rewards programs, and others. Rewards programs typically involve the award of rewards points to a consumer based upon certain incentivized actions taken by the consumer, such as the purchase of a certain value of goods or services from a particular merchant. Rewards points may be referred to by a particular rewards program as "rewards dollars," "rewards miles," or other descriptive name. The consumer then has the option of redeeming his or her accumulated rewards points according to rewards program rules to obtain better terms for a later transaction. The costs of providing such rewards program incentives to the cardholder may be borne solely by the issuer, jointly by the issuer and a merchant or third party, or solely by a merchant or third party, depending upon the type and sponsorship of the rewards program.

Special or customized issuer-merchant relationships such as rewards programs often require direct communications between the parties for transaction authorization and/or clearing (e.g., for financial transactions and rewards points redemptions). Further, the issuer may be required to maintain back office processes to manage the financial and rewards program aspects of these special or customized relationships. Alternatively, the issuers may exploit communications through merchant acquirers to facilitate indirect communications with the merchants.

Consideration is now being given to ways of improving implementations of the special or customized issuer-merchant relationships in the payment-by-card industry. In particular, attention is being directed to utilizing legacy general purpose bankcard infrastructure to support the transaction routing, merchant accounting, and financial settlement for these special or individualized relationships.

At least some known special or customized issuer-merchant relationships include rewards programs or other special offers (e.g., financing) that are applied to purchases made by account holders or customers using a payment card over a bankcard network. Typically, in these cases, the merchant is required to record any redemption of rewards program points by an account holder at the point of sale, apart from the standard payment card transaction. Furthermore, typically in these cases, merchant acquirers' systems must be modified to accommodate rewards program parameters, and/or the merchant must communicate directly with the issuer or cardholder, in order to enable reimbursement and tracking of rewards program usage. Consideration is now being given to ways to enable account holders to register in a rewards program being offered by a merchant and then apply the rewards program to a payment transaction between the merchant and the card holder using a payment card over a bankcard network.

BRIEF DESCRIPTION OF THE INVENTION

In one aspect, a method for applying promotion codes to a payment transaction is provided. The method uses at least one input device in communication with a database. The payment transaction includes a purchase made by a cardholder using a payment card over a payment card network. The method includes storing promotion data within the database, wherein the promotion data includes at least one merchant participating in the payment card network, at least one promotional program offered by the at least one merchant to the cardholder, and promotion codes associated with the at least one promotional program. At least one of the promotional programs offered includes a qualifying number of rewards points for a rewards program. The method further includes storing rewards data within the database including a current number of rewards points accumulated by the cardholder as part of the rewards program, providing access to the promotion data through the at least one input device including each promotional program having a qualifying number of rewards points that is less than the current number of rewards points for the cardholder, receiving a selected promotional program from the cardholder using the at least one input device, and automatically applying the promotion codes associated with the selected promotional program to the payment transaction.

In another aspect, a network-based system for applying promotion codes to a payment transaction including a purchase made by a cardholder using a payment card over a payment card network is provided. The system includes a client system, a database for storing information, and a server system configured to be coupled to the client system and the database. The server configured to store promotional data within the database including at least one merchant participating in the payment card network, each promotional program offered by the at least one merchant to the cardholder, and promotion codes associated with each promotional program offered to the cardholder, wherein at least one of the promotional programs offered includes a qualifying number of rewards points for a rewards program. The server further configured to receive rewards data including a current number of rewards points accumulated by the cardholder as part of the rewards program, display the promotion data on the client system including each promotional program offered by the at least one merchant to the cardholder wherein each promotional program displayed includes a qualifying number of rewards points that is less than the current number of rewards points for the cardholder, receive selection data from the client system wherein the selection data representing the promotional program selected by the cardholder, and automatically apply the promotion codes associated with the selected promotional program to the payment transaction.

In another aspect, a computer coupled to a database for applying promotion codes to a payment transaction performed by a cardholder using a payment card over a payment card network is provided. The computer is in communication with an input device. The database stores promotional data including each merchant participating in the payment card network, each promotional program offered by each merchant to the cardholder, and promotion codes associated with each promotional program offered to the cardholder, wherein at least one of the promotional programs offered includes a qualifying number of rewards points for a rewards program. The database further stores rewards data including a current number of rewards points accumulated by the cardholder as part of the rewards program, and the input device accesses the database and displays the promotion data including each promotional program offered by each merchant to the cardholder wherein each promotional program displayed includes a qualifying number of rewards points that is less than the current number of rewards points for the cardholder. The computer is programmed to receive selection data from the input device wherein the selection data represents the promotional program selected by the cardholder for application to a payment transaction initiated by the cardholder with the merchant offering the selected promotional program, and automatically apply the promotion codes associated with the selected promotional program to the payment transaction.

In another aspect, a computer program embodied on a computer readable medium for applying promotion codes to a payment transaction including a purchase made by a cardholder using a payment card over a payment card network is provided. The program includes at least one code segment that stores within a database promotion data including at least one merchant participating in the payment card network, each promotional program offered by the at least one merchant to the cardholder, and promotion codes associated with each promotional program offered to the cardholder, wherein at least one of the promotional programs offered includes a qualifying number of rewards points from a rewards program. The program further includes at least one code segment that stores within the database rewards data including a current number of rewards points accumulated by the cardholder as part of the rewards program, enables access to the promotion data via at least one input device including each promotional program having a qualifying number of rewards points that is less than the current number of rewards points for the cardholder, receives selection data from the at least one input device wherein the selection data representing a promotional program selected by the cardholder, and applies the promotion codes associated with the selected promotional program to the payment transaction initiated by the cardholder.

BRIEF DESCRIPTION OF THE DRAWINGS

FIG. 9 is a flowchart illustrating exemplary processes for implementing special or customized issuer-merchant relationships in a payment-by-card system as shown in FIG. 4 and implemented using the system shown in FIG. 2.

DETAILED DESCRIPTION OF THE INVENTION

Figure 1:
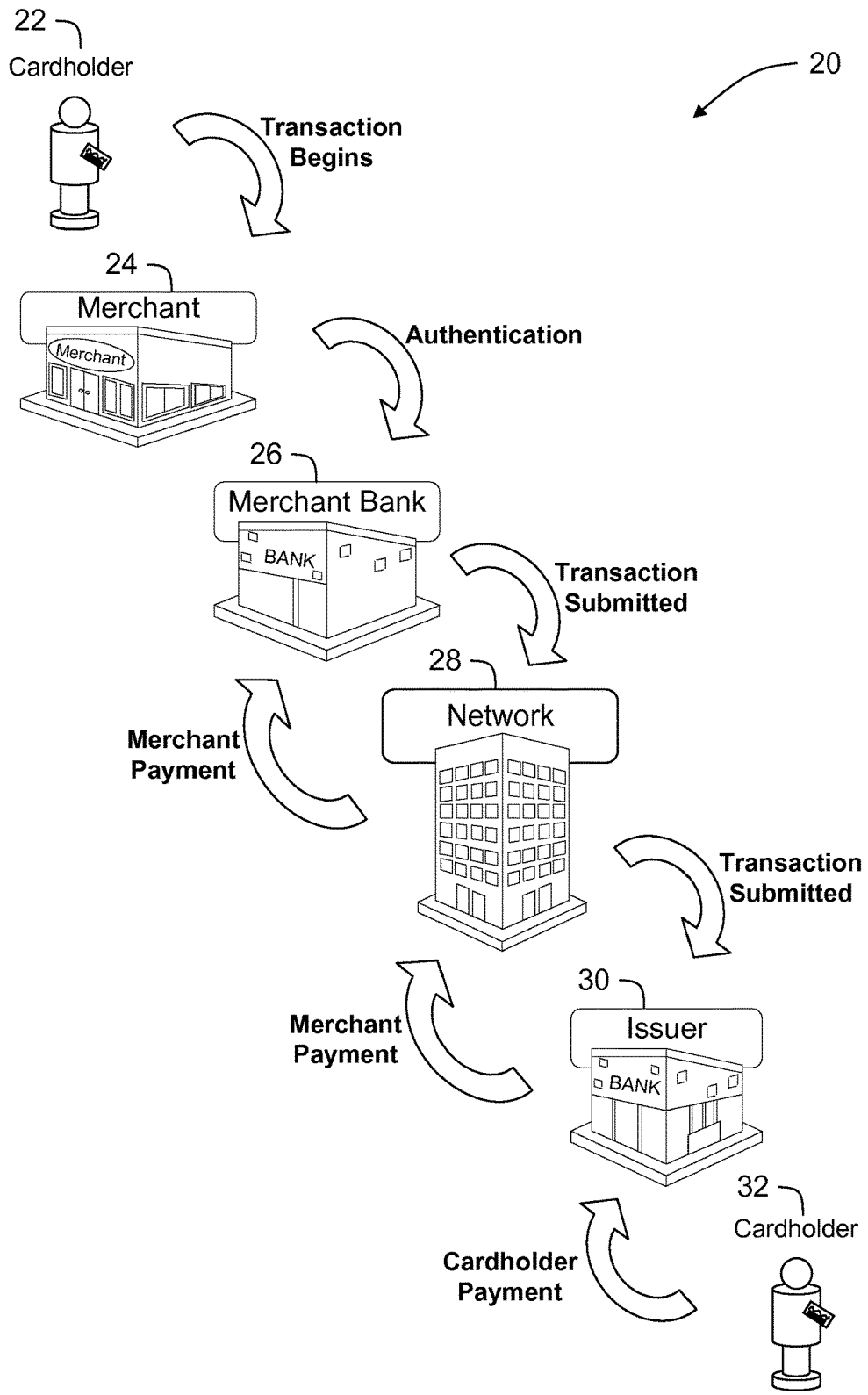
FIG. 1 is a schematic diagram illustrating an exemplary multi-party payment card industry system for enabling ordinary payment-by-card transactions in which the merchants and issuer do not need to have a one-to-one special relationship.

Described in detail herein are exemplary embodiments of systems and processes for implementing special or customized issuer-merchant relationships in the payment-by-card industry. The systems and processes include a cardholder that utilizes a payment card to make a purchase from a merchant, wherein the merchant has registered with a bankcard network such that the purchase made by the cardholder using the payment card can be processed over the bankcard network.

The systems and processes described herein facilitate enabling a cardholder to select a promotion offered by a merchant for enticing the cardholder to make a purchase from the merchant, and/or select a promotion offered by an issuer for enticing the cardholder to make purchases using the payment card associated with the issuer. The systems and processes then apply promotion codes associated with the selected promotion to a purchase made by the cardholder from the merchant. A promotion or promotional program, as described herein, is typically a special offer made by a merchant or issuer to a cardholder (e.g., 30 days same as cash, 90 days no interest, no payment due for 6 months, or a predetermined percentage (e.g., 10%) off the purchase price of the product or service, etc.) for enticing the cardholder to make a purchase from the merchant using the payment card. The promotional programs described herein also may include participation in a rewards program or redemption of rewards points accumulated through the use of a payment card. A rewards program enables a cardholder to redeem rewards points accumulated previously to obtain better terms for a current transaction. For example, a rewards program may offer a cardholder an option to redeem 2,000 rewards points in order to receive 10% off of a purchase, or to redeem 500 rewards points and pay no interest for 6 months, or to redeem 800 rewards points and receive a $100 rebate. Accordingly, as described herein, the terms "special offers", "promotions" or "promotional programs" refer to any offer made by a merchant or an issuer to a cardholder that may or may not include the use of rewards points that result in an enticement (i.e., better terms or a reward) being made to the cardholder for making a purchase from the merchant with a payment card.

More specifically, the systems and processes described herein facilitate, for example, electronic submission of information using a client system, automated extraction of information, and web-based reporting for internal and external system users. A technical effect of the systems and processes described herein include at least one of (a) storing promotion data in a promotion database for merchants participating in the bankcard network including a merchant name, a merchant identification (ID) number, promotion identifiers, transaction qualifications, terms of promotions and promotion codes, wherein the promotion data includes rewards-based and non-rewards based promotional programs; (b) storing rewards data in a rewards module or "rewards platform" for rewards program sponsors participating in the bankcard network, including the sponsor of each rewards program, a number of accumulated points for each cardholder, and rules for tracking the accumulation and redemption of rewards points; (c) registering the promotion data in a merchant accounting system, also known as a deferred payment tracking system; (d) transmitting the promotion data and the rewards data to a cardholder database including a displayable list of available rewards-based and non-rewards-based promotions for each cardholder; (e) selecting by a cardholder at least one of a rewards-based and a non-rewards-based promotion from the list of available promotions, the selecting is performed by the cardholder using an input device such as a personal computer, a cellular telephone, a personal digital assistant (PDA), or other web-based connectable equipment in communication with the cardholder database, wherein the displayed rewards-based promotions are based on the number of reward points the cardholder has accumulated (i.e., the system may only display the rewards-based promotions that the cardholder has a sufficient amount of accumulated rewards points to qualify for); (f) creating a rewards debit entry if the cardholder selects a rewards-based promotion; (g) receiving the selected promotion and rewards data at the merchant screening module including the associated transaction codes and transaction qualifications; (h) transmitting the promotion codes associated with the selected promotion data to the promotion code processing module; (i) after the cardholder makes a purchase transaction from the merchant using a payment card over the bankcard network, determining at the merchant screening module whether the cardholder has registered for a promotional program and validating the transaction at the promotion code processing module including determining whether the transaction satisfies the transaction qualifications for the selected promotion; (j) communicating to the cardholder database that the selected rewards-based promotion has been validated; (k) applying at the promotion code processing module the promotion codes to the transaction; and (l) transmitting the rewards debit entry to the rewards platform for recording and adjusting the number of accumulated rewards points.

After a cardholder selects an available promotion, also known as a promotional program, and a transaction is submitted to the bankcard network, the transaction is screened by the system to determine if the transacting merchant and issuer have a relationship that corresponds to a registered program, which covers the transaction. At the promotion code processing module, the transaction is validated as covered or, conversely, designated as not covered by a registered program such as a rewards program. The validation may involve the use of suitable algorithms to apply a specific set of criteria which define the relationship or program. The specific set of criteria may, for example, include transaction parameters such as the merchant type and identity, the cardholder identity, the nature of the transacted goods or services, and the location, time and dollar value of the transaction. For the case where the validated transaction is one for which the cardholder selected a program involving a rewards point redemption, the rewards platform receives data associated with the completed transaction. The rewards platform in turn posts confirmed rewards points redemptions to the cardholder's rewards program account and generates adjustment records for any immediate effect of the redemption on the cardholder's account with the issuer, for example to reflect rebates obtained directly from the issuer by the cardholder in exchange for redeeming rewards points. In one embodiment, the promotions may be funded by the merchant, a third party, or the issuer, or the promotions may be jointly funded by the merchant and/or the third party and/or the issuer.

Next, at the promotion code processing module, the validated transaction may be flagged if it qualifies for special pricing under the rewards program or other registered promotional program. For the case where the transaction qualifies for special pricing under the rewards program or other registered promotional program, the merchant accounting system module is configured to calculate the differential between the special pricing for the specific transaction under the program and the standard pricing of a normal bankcard transaction (i.e., which is not covered by the program). The merchant accounting system module is further configured to summarize transaction activity using a number of configurable variables, to report adjustments to the issuer's interchange, to generate payment files to credit or debit merchants' accounts on behalf of the issuer for the differential, and to provide miscellaneous reports to both the issuer and merchants to facilitate reconcilement. The settlement procedures for the standard value of the transaction between the acquirer and issuer are the same or similar to those used in a conventional payment card program as shown in FIG. 1.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a schematic diagram 20 illustrating an exemplary multi-party payment card industry system for enabling ordinary payment-by-card transactions in which the merchants and issuer do not need to have a one-to-one special relationship. The present invention relates to a payment card system, such as a credit card payment system using the MasterCard® interchange network. The MasterCard® interchange network is a set proprietary communications standards promulgated by MasterCard International Incorporated® for the exchange of financial transaction data and settlement of funds between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe or chip on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor" or a "third party processor."

Using the interchange network 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge for a credit card transaction is not posted immediately to a consumer's account because bankcard associations, such as MasterCard International Incorporated®, have promulgated rules that do not allow a merchant to charge, or "capture," a transaction until goods are shipped or services are delivered. However, with respect to at least some debit card transactions, a charge may be posted at the time of the transaction. When a merchant ships or delivers the goods or services, the merchant captures the transaction by, for example, appropriate data entry procedures on the point-of-sale terminal. This may include bundling of approved transactions daily for standard retail purchases. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group. More specifically, a transaction is typically settled between the issuer and the interchange network, and then between the interchange network and the merchant bank (also known as the acquirer bank), and then between the merchant bank and the merchant.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
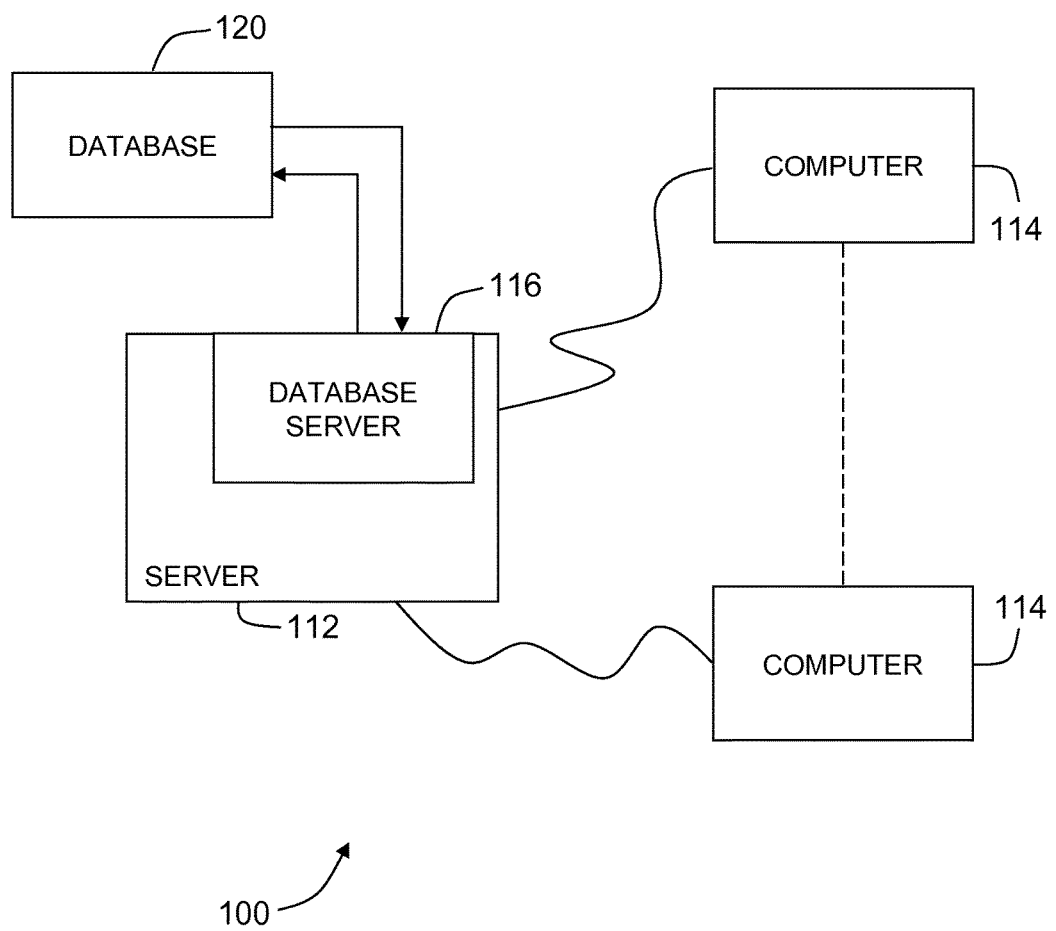
FIG. 2 is a simplified block diagram of an exemplary embodiment of a server architecture of a system, in accordance with one embodiment of the present invention.

FIG. 2 is a simplified block diagram of an exemplary system 100, in accordance with one embodiment of the present invention. In one embodiment, system 100 is a payment card system used for implementing special or customized issuer-merchant relationships. In another embodiment, system 100 is a payment card system configured to prompt account holders to select a promotional program being offered by a merchant or an issuer including a rewards-based promotional program, automatically apply corresponding promotion codes to a payment transaction satisfying the qualifications of the selected promotional program, and adjust the rewards points of the account holder based on the completed payment transaction.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

As discussed below, database 120 stores transaction data generated as part of sales activities conducted over the bankcard network including data relating to merchants, account holders or customers, and purchases. Database 120 may also include data relating to rewards programs and special offers being made by a merchant or issuer including a number of rewards points accumulated by each customer for a particular rewards program being administered by system 100.

Figure 3:
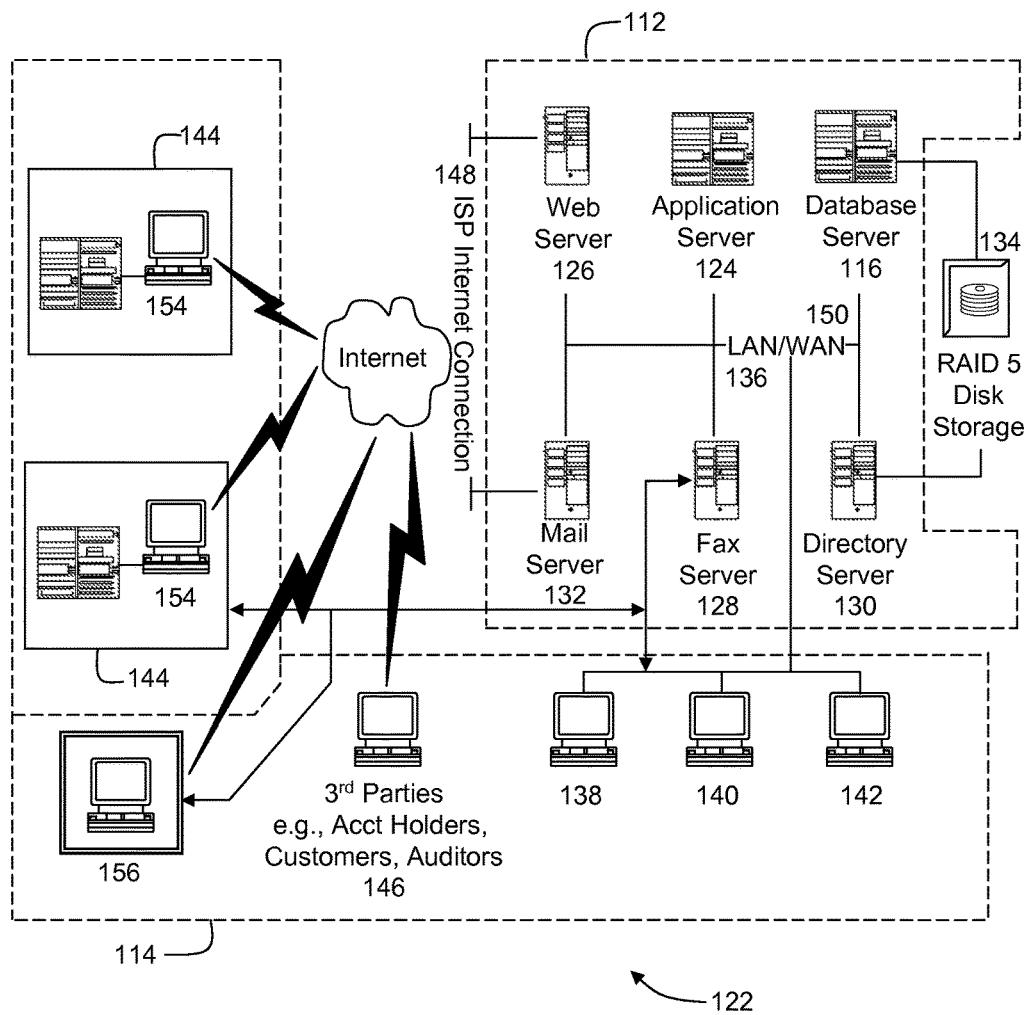
FIG. 3 is an expanded block diagram of an exemplary embodiment of a server architecture of a system, in accordance with one embodiment of the present invention.

FIG. 3 is an expanded block diagram of an exemplary embodiment of a server architecture of a system 122, in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
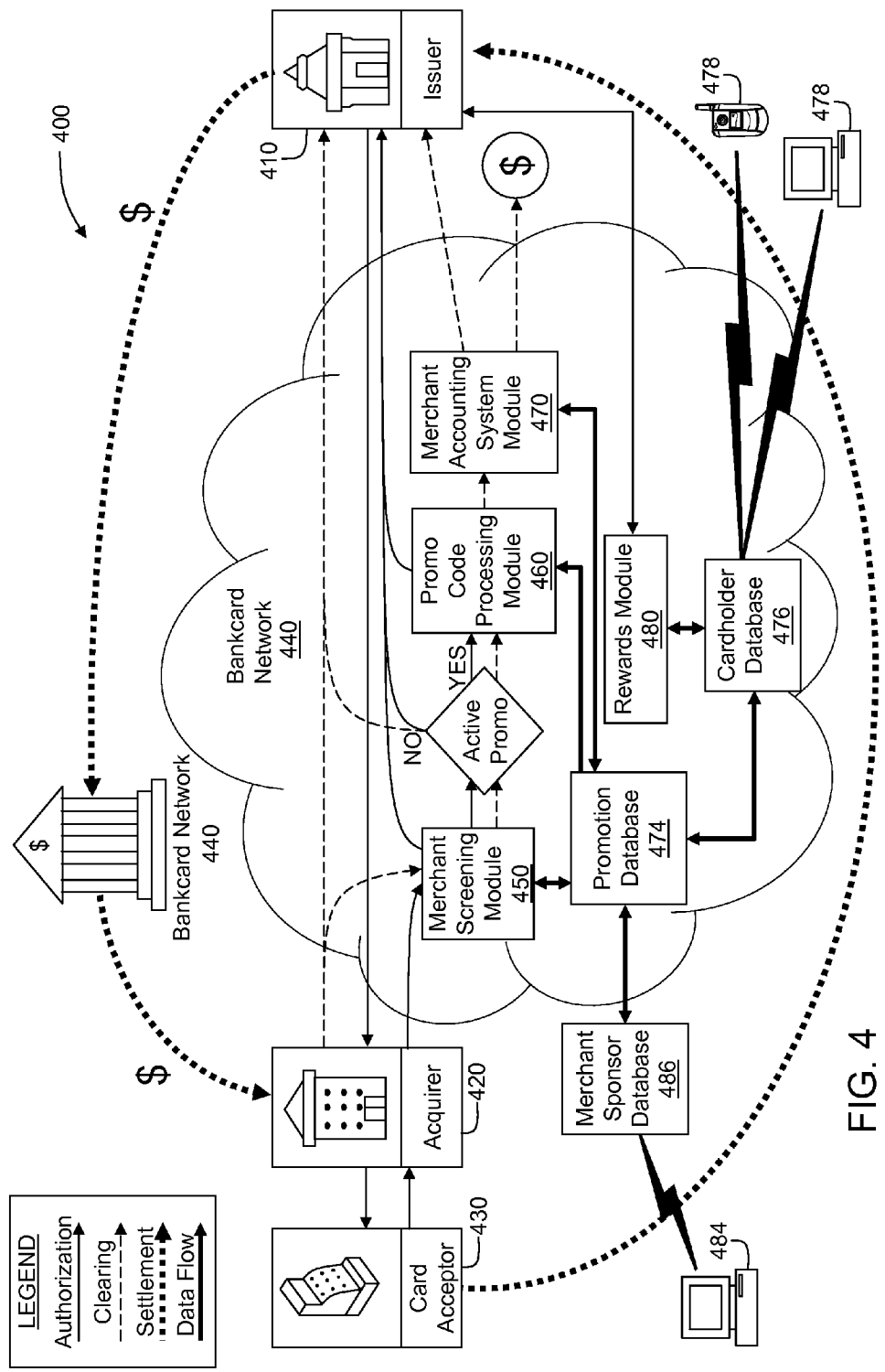
FIG. 4 is a schematic diagram illustrating an exemplary process for implementing special or customized issuer-merchant relationships in a payment-by-card system, in accordance with one embodiment of the present invention.

FIG. 4 is a schematic diagram 400 illustrating an exemplary process for implementing special or customized issuer-merchant relationships in a payment-by-card system 100 (shown in FIG. 2), in accordance with one embodiment of the present invention. System 100 exploits legacy payment-by-card industry infrastructure for implementing a special or customized issuer-merchant relationship. The legacy payment-by-card industry infrastructure includes traditional payment networks (e.g., general purpose bankcard payment network 440), which links entities such as the card issuer or bank (e.g., issuer 410), card acceptors (e.g., merchants 430), and third-party transaction processors (e.g., merchant acquirers 420). System 100 incorporates one or more specific processing modules (e.g., merchant screening module 450, promotion code processing module 460, merchant accounting system module 470) for processing special relationship transactions in payment network 440.

In addition, system 100 includes promotion database 474, cardholder database 476, remote devices 478, and rewards module 480. System 100 may also include merchant computer 484 in communication with merchant database 486. In an alternative embodiment, merchant computer 484 and merchant database 486 may include a computer associated with a sponsor of the promotion selected by the cardholder. As discussed in more detail in FIG. 9 below, promotion database 474 is in communication with merchant screening module 450, cardholder database 476, merchant database 486, promotion code processing module 460, and merchant accounting system 470. Cardholder database 476 is in communication with remote devices 478 and rewards module 480. Rewards module 480 is also in communication with issuer 410. In the example embodiment, merchant screening module 450, promotion code processing module 460, merchant accounting systems module 470, promotion database 474, cardholder database 476, merchant database 486, and rewards module 480 are all shown as separate modules or units. In alternative embodiments, the structure and functions of these modules or units can be easily merged in a single module or partitioned into further modules. Furthermore, separate modules may communicate information directly, or indirectly through other modules.

Remote devices 478, also known as input devices, include such devices as a personal computer, a cellular telephone, a personal digital assistant (PDA), or other web-based connectable equipment that can be configured to communicate with cardholder database 476. In one embodiment, remote device 478 may include a computer or register located at the merchant or the point of sale (POS), wherein at the time the purchase is made by the cardholder the merchant is prompted to ask the cardholder whether the cardholder would like to select a promotional program being offered by the merchant/issuer to the cardholder for the corresponding transaction.

In practice, an issuer 410 who has a special relationship or program with specific merchants registers the program in merchant database 486 through the bankcard network 440 for tracking card transactions and associating features (e.g., benefits such as special pricing) of the program with the card transactions. Card transaction data ("transactions") from various merchant sites 430 may be collected in a conventional manner, for example, by merchant acquirer 420 or other traditional entities who then submit the transaction to network 440 for forwarding to issuer 410. The transactions may be formatted in a conventional manner (e.g., according to any suitable payment industry standards used on network 440). In another embodiment, a merchant, using merchant computer 484, can transmit or upload promotional programs into merchant database 486, which communicates with promotion database 474 such that the various cardholders can access the different programs through cardholder database 476.

In the example embodiment, promotion database 474 receives and stores promotion data from merchants participating in bankcard network 440. Promotion database 474 may receive and store data for both rewards-based and non-rewards-based promotions. The promotion data includes at least one of a merchant name, a merchant identification (ID) number, promotion identifiers, transaction qualifications, terms of promotions and promotion codes. In other words, promotion database 474 stores data describing the different promotions or programs that a merchant registered with bankcard network 440 is offering to cardholders. These promotions may include programs such as 30 days same as cash, 90 days no interest, no payment due for 6 months, or a predetermined percentage (e.g., 10%) off the purchase price of the product or service, etc., to entice the cardholder to make a purchase from a merchant using the payment card. These promotions may also include rewards-based programs such as redeem 2,000 rewards points to receive 10% off a purchase, redeem 500 rewards points and pay no interest for 6 months, or redeem 800 rewards points and receive a $100 rebate.

After bankcard network 440 (e.g., MasterCard®) registers a merchant to participate in system 100 and promotion data is stored in promotion database 474, the promotion data is then communicated and registered within merchant accounting system 470. Merchant accounting system 470 is also referred to as a deferred payment tracking system. The promotion data is also transmitted to cardholder database 476 including a displayable list of available promotions or programs that are being offered to each cardholder.

Also in the example embodiment, rewards module 480, also referred to as a "rewards platform," stores parameters of one or more rewards programs. Each rewards program respectively may be sponsored solely by an issuer, jointly by an issuer and a merchant or third party, or solely by a merchant or third party. Rewards program parameters contained in rewards module 480 may include rules for tracking the accumulation and redemption of rewards points and for adjusting the issuer's financial records to reflect the cardholder's rewards program usage. In the example embodiment, rewards module 480 may also store data associated with rewards-based promotions analogous to the data stored in promotion database 474, such as redeem 2,000 rewards points to receive 10% off a purchase, redeem 500 rewards points and pay no interest for 6 months, or redeem 800 rewards points and receive a $100 rebate. Alternatively, all such rewards-based promotion data may be received and stored directly along with non-rewards-based promotion data in promotion database 474, or promotion database 474 and rewards module 480 may be combined in a single platform. Rewards-based promotion data stored in rewards module 480 is also in communication with cardholder database 476 such that a cardholder can access the number of rewards points the cardholder has accumulated from prior purchases.

In the example embodiment, a cardholder accesses cardholder database 476 using a remote input device 478 such that promotion data including the list of available promotions being offered to the cardholder is displayed on remote device 478. The cardholder may pre-register a cell-phone telephone number or other identifying characteristic of a remote input device 478 to automatically associate one or more remote input devices 478 with the cardholder's payment card account. In addition, the cardholder may pre-register log-in information that then may be communicated by the cardholder at the time the promotion is selected from any remote input device 478. As part of this pre-registration process, the cardholder may opt to receive regular e-mails or text message notifications regarding available rewards promotions (or other promotions) from participating local merchants, the issuer, or the bankcard network. Moreover, instructions regarding how to access current promotions may be provided at the point of sale. For example, a cardholder may be prompted to use remote device 478 to access cardholder database 476 by a poster or banner displayed at the merchant's store that advises, for instance, "TEXT 'PROMO' TO PHONE NUMBER 555-5555 TO RECEIVE TODAY'S SPECIAL OFFERS." Alternatively, promotion data including the list of available promotions being offered to the cardholder are automatically "pushed" from promotion database 476 for display on remote devices 478.

Once displayed on remote device 478, the cardholder can then select one or more of the promotions from the list of available promotions. By selecting one of the promotions, the cardholder is then registered within system 100 to receive the terms and conditions being offered as part of the promotion upon making a purchase from the merchant with a payment card over bankcard network 440. In an alternative embodiment, a cardholder can register for a promotion within system 100 after making a purchase from a participating merchant with a payment card over bankcard network 440 provided that the promotion selection is completed prior to the transaction being cleared through the bankcard network.

After a cardholder selects a promotion, cardholder database 476 in communication with rewards module 480 determines whether the cardholder has a sufficient amount of accumulated rewards points if a rewards-based promotion is selected. In an alternative embodiment, cardholder database 476 only displays those rewards-based promotions that the cardholder has sufficient number of accumulated points to satisfy. Cardholder database 476 also creates a rewards debit entry if a sufficient amount of accumulated rewards points does exist. The selected promotion data is then received at merchant screening module 450 for indicating the merchant has a pending promotional program request.

The promotion codes associated with the promotion selected by the cardholder are then transmitted to promotion code processing module 460 such that the transaction corresponding to the selected promotion may be tagged for proper processing. Promotion code processing module 460 is configured to apply the corresponding promotion codes to the cardholder payment transaction when the cardholder makes the purchase from the merchant that corresponds with the selected promotion program. In other words, when the cardholder purchases the product or service associated with the cardholder selected promotion using a payment card over bankcard network 440, promotion code processing module 460 applies the appropriate promotion codes to the cardholder payment transaction, after the transaction has been validated, such that the selected promotion is applied to the cardholder purchase.

After promotion code processing module 460 validates the transaction for the selected rewards-based promotion, cardholder database 476 receives notification that the transaction has been validated. Cardholder database 476 then transmits the rewards debit entry to rewards module 480 for recording.

More specifically, after a cardholder selects an available promotion and a transaction is submitted to bankcard network 440, the transaction is interrogated to determine if the transacting merchant and issuer have a relationship that corresponds to a registered program which covers the transaction and if the cardholder has registered for a promotion that covers the transaction. During an authorization, merchant screening module 450 determines whether the cardholder has registered for a promotional program. If the cardholder has not registered for a promotional program, the system may bypass promotion code processing module 460 and continue with the authorization process. If, however, merchant screening module 450 determines the cardholder has registered for a promotional program, the system directs the transaction to promotion code processing module 460 for validation including determining whether the transaction is validated as covered or, conversely, designated as not covered by a registered program and if covered, may optionally include the promotion codes on the authorization request sent to issuer 410. During the clearing process, merchant screening module 450 determines whether the cardholder has registered for a promotional program and if so, forwards the transaction to the promotion code processing module 460 for additional processing, including further processing in the merchant accounting system module 470, as needed. The validation may involve the use of suitable algorithms to apply a specific set of criteria which define the relationship or program. The specific set of criteria may, for example, include transaction parameters such as the merchant type and identity, the cardholder identity, the nature of the transacted goods or services, and the location, time and dollar value of the transaction. For the case where the validated transaction is one for which the cardholder selected a program involving a rewards point redemption, rewards module 480 receives data associated with the completed transaction. Rewards module 480 in turn posts confirmed rewards points redemptions to the cardholder's rewards program account and generates adjustment records for any immediate effect of the redemption on the cardholder's account with issuer 410, for example to reflect rebates obtained directly from the issuer by the cardholder in exchange for redeeming rewards points.

Next, at promotion code processing module 460, the validated transaction may be flagged if it qualifies for special pricing under the rewards program or other registered promotional program. For the case where the transaction qualifies for special pricing under the rewards program or other registered promotional program, the merchant accounting system module 470 is configured to calculate the differential between the special pricing for the specific transaction under the program and the standard pricing of a normal bankcard transaction (i.e., which is not covered by the program). Merchant accounting system module 470 is further configured to summarize transaction activity using a number of configurable variables, to report adjustments to the issuer's interchange, to generate payment files to credit or debit merchants' accounts on behalf of the issuer for the differential, and to provide miscellaneous reports to both the issuer and merchants to facilitate reconcilement. Merchant accounting system module 470 may also be configured to create a record for payments to be made by a program sponsor for engaging in the promotions. The settlement procedures for the standard value of the transaction between the acquirer 420 and issuer 410 are the same or similar to those used in a conventional payment card program as shown in FIG. 1.

From the cardholder's perspective, system 100 advantageously creates flexibility in the use of rewards program points. System 100, for example, enables the cardholder to use a cell phone or other portable communications or network-enabled device, or a point-of-sale terminal, to track current rewards point totals and to become aware of the most current rewards-based promotions and other promotions while shopping. The cardholder may also benefit by receiving, for example, e-mail or text-message notifications of special rewards-based or non-rewards-based promotions from area merchants or from the issuer.

From the issuer's perspective in the context of implementing special relationships, system 100 advantageously eliminates the need to establish connectivity directly with merchants (and/or one or more acquirers) to implement the special relationships. Further, system 100 reduces back office processing requirements on the issuer. System 100 also allows the issuer to independently manage the special relationships with the merchants without third party (e.g., an acquirer) involvement. The issuer can, for example, independently manage rewards programs and proprietary pricing structures directly with merchants without having to go through an acquirer. Further, system 100 allows the issuer to offer pricing plans that are not transaction-based. System 100 allows the issuer to use the same payment network infrastructure to process chargebacks and make adjustments directly with merchants.

From the merchants' perspective, system 100 provides special relationship processing, which is transparent to merchants' acquirers. Further, system 100 improves settlement as all transactions including those associated with the special relationship are settled through the general purpose bankcard process instead of ad hoc systems specific to the special relationships. Merchants also may expect improved pricing from issuers due to infrastructure efficiencies in system 100. System 100 also advantageously provides merchants with the ability to offer reward program incentives to improve sales without developing point-of-sale infrastructure to support the rewards program.

From the merchant acquirers' perspective, system 100 advantageously allows transparent passthrough of the special relationship related processing without imposing any specific coding or setup requirements related to the special relationships on the acquirers. Yet, system 100 advantageously increases bankcard transaction volume by including the special relationship transactions in the acquirers' settlement with issuers.

From the bankcard network's perspective in the context of implementing special relationships, system 100 advantageously establishes special relationships between merchants and cardholders. System 100 may also convert at least some private label transactions into transactions using the payment card associated with the bankcard network. System 100 also creates opportunities for partnerships with cellular telephone companies because system 100 enables cardholders to register for promotion programs using cellular telephones, wherein these cardholder initiated promotion programs are then applied to purchase transactions made by the cardholder from a merchant. System 100 also provides incentive for acquirers and issuers to process transactions through bankcard network 440. System 100 may also generate new revenue streams between merchants and cardholders directly.

From a program sponsor's perspective, system 100 can reduce liabilities from accrued rewards points by allowing more flexible rewards point redemptions.

Conventional card transaction data processing involves clearing, authorization, chargebacks and adjustments, settlements, and other front or back end processes. During the clearing process, the acquirer provides the appropriate issuer data required to identify the cardholder's account and the dollar amount of the sales. When the issuing bank gets this data, the bank posts the amount of the sale as a draw against the cardholder's available credit and prepares to send payment to the acquirer. Authorization involves the acknowledgment by the issuer that a particular account may be charged for the amount of the sale. In the settlement process, the issuer sends a record of money that is being transferred from its account to that of the acquirer, who then pays the merchant. Funds are settled between issuers and acquirers through selected bank accounts. Chargebacks and adjustments processes relate to a card transaction that is billed back to the merchant after the sale has been settled. More specifically, a transaction is typically settled between the issuer and the interchange network, and then between the interchange network and the merchant bank (also known as the acquirer bank), and then between the merchant bank and the merchant.

The authorization, clearing, chargebacks and adjustments, and settlements processes for card transactions in system 100 are further described in more detail herein with reference to FIGS. 5-8, respectively.

Figure 5:
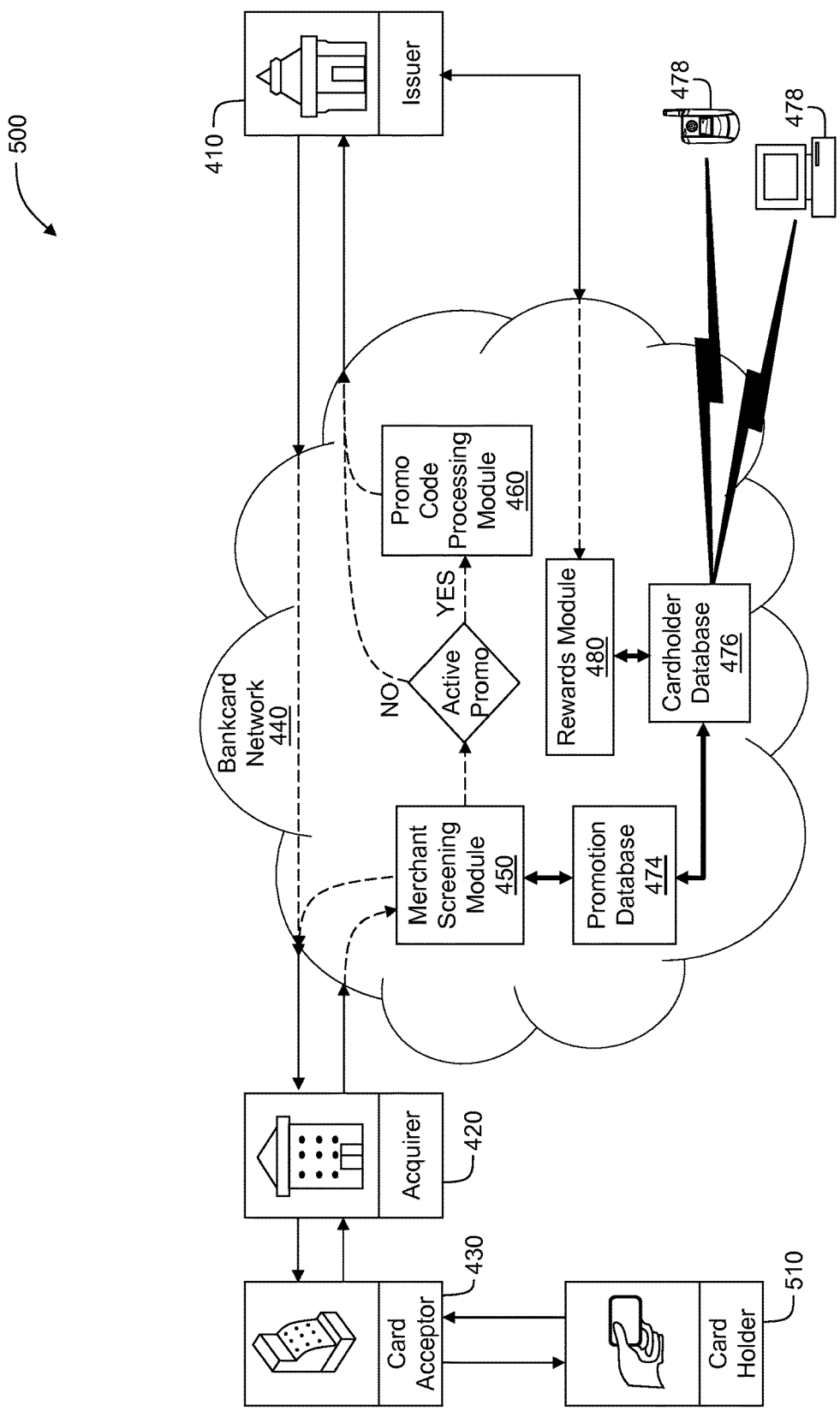
FIG. 5 is a schematic diagram illustrating authorization request process flows in the exemplary process shown in FIG. 4, in accordance with one embodiment of the present invention.

FIG. 5 is a schematic diagram 500 illustrating authorization request process flows in the exemplary process shown in FIG. 4, in accordance with one embodiment of the present invention. Components shown in FIGS. 5-8 that are identical to components of diagram 400 (shown in FIG. 4), are identified in FIGS. 5-8 using the same reference numerals as used in FIG. 4. The authorization requests may have the same format as standard general purpose bankcard authorization requests. The authorization request is a result of cardholder 510 using a payment card to complete a transaction with merchant 430. The flow of these authorization requests from merchant 430 via acquirer 420 to network 440 can utilize existing flow paths established for ordinary card transactions. Then, network 440 routes the authorization requests to merchant screening module 450 for verification that the requesting merchants are included in a registered program. In the case of rewards-based transactions, merchant screening module 450 may also be configured to reduce the authorization amount by the amount of the promotion reduction.

Merchant screening module 450 may be configured to process the authorization requests, for example, to optionally cross-reference merchant IDs, authorize, decline, or pass on the request to issuer 410 systems for further processing. In some embodiments of system 100 (shown in FIG. 2), merchant screening module 450 may be further configured to route a specific card number transaction to different issuer systems depending on specific criteria met by the transaction (e.g., merchant number, dollar amount, etc.). In the case of non-financial rewards transactions, merchant screening module 450 may be configured to capture and store transactions for later submission into a nightly clearing process. Additionally, merchant screening module 450 could be configured to pass a transaction onto module 460 to include the appropriate promotion codes in the authorization request and then communicate with the issuer so that the issuer can make the appropriate decisions for example in the cases of transactions involving installments or lines of credit.

Figure 6:
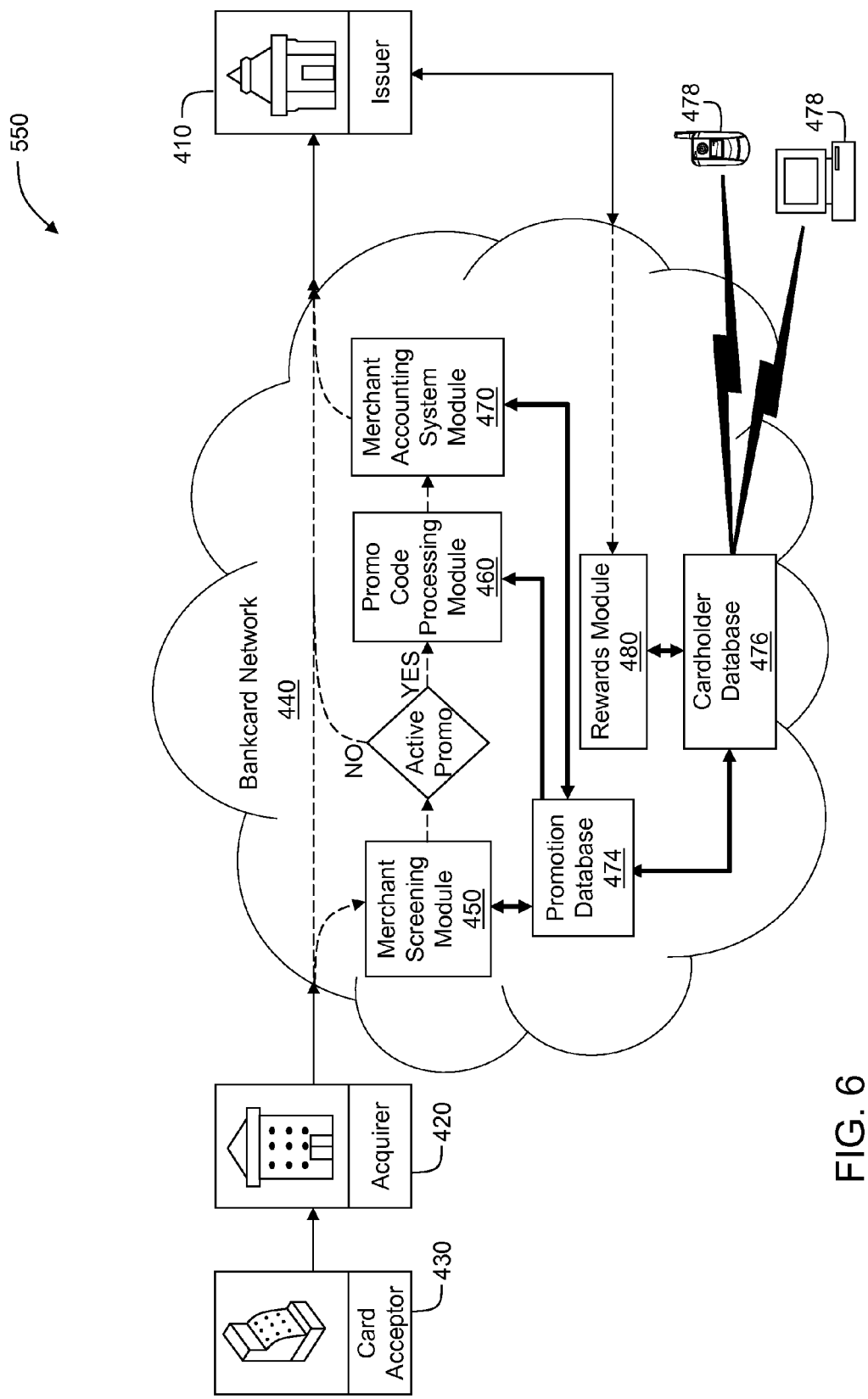
FIG. 6 is a schematic diagram illustrating clearing process flows in the exemplary process shown in FIG. 4, in accordance with one embodiment of the present invention.

FIG. 6 is a schematic diagram 550 illustrating clearing process flows in the exemplary process shown in FIG. 4, in accordance with one embodiment of the present invention. In the example embodiment, payment card transaction data (i.e., clearing records) may have the same format as standard general purpose bankcard clearing records. Like the flow of the authorization requests, the flow of these records from merchant 430 via acquirer 420 to network 440 can utilize existing flow paths and standard interchange rates established for ordinary card transactions (i.e., non-special relationship transactions). Network 440 may route the clearing records to merchant screening module 450 as part of nightly clearing to include the appropriate cross referencing merchant identifications (IDs), and to flag records from merchants not included in the registered programs. Optionally, the merchant screening module 450 may be a secondary process performed outside of the clearing process.

Cardholder database 476 receives data relating to a promotion selected by a cardholder, and determines whether the cardholder has a sufficient amount of accumulated rewards points when a rewards-based promotion is selected from its communication with rewards module 480. The promotion data is then transmitted to merchant screening module 450. Merchant screening module 450 receives the indicator from promotion database 474. Merchant screening module 450 also determines whether the merchant is registered with network 440. Promotion code processing module 460 determines whether the transaction is covered by the promotion selected by the cardholder. If a covered transaction involves a rewards point redemption, rewards platform 480 receives data associated with the completed transaction and generates separate transaction clearing records for any immediate effect of the redemption on the cardholder's account with issuer 410, for example to reflect rebates obtained by the cardholder directly from the issuer in exchange for redeeming rewards points. Alternatively, the original clearing transaction can be adjusted to reflect the discounted amount.

In addition, after merchant screening module 450 determines that the merchant is registered with network 440 and that the transaction is covered by the promotion selected by the cardholder, network 440 then routes the clearing records to promotion code processing module 460 to generate the appropriate codes under registered programs so that the appropriate discount differentials can be calculated for the merchants covered by the programs. Next, network 440 routes the clearing records to the merchant accounting system module 470 to calculate the discount differential for individual clearing records. The discount differential may be based on any number of configurable variables. For example, the discount differential may be based on discount rates, which may be listed in merchant account records available on the network, and on the promotion codes, if any. Further, in the case of a rewards program, merchant accounting system module 470 may be configured to calculate the fees to be charged to the merchant for participation in the rewards program.

Next in the clearing process, merchant accounting system module 470 forwards the clearing records to issuer 410, records transactions and summarizes them by a number of configurable variables to debit or credit differential to merchant accounts, and provides reporting to the merchants and issuer 410.

Figure 7:
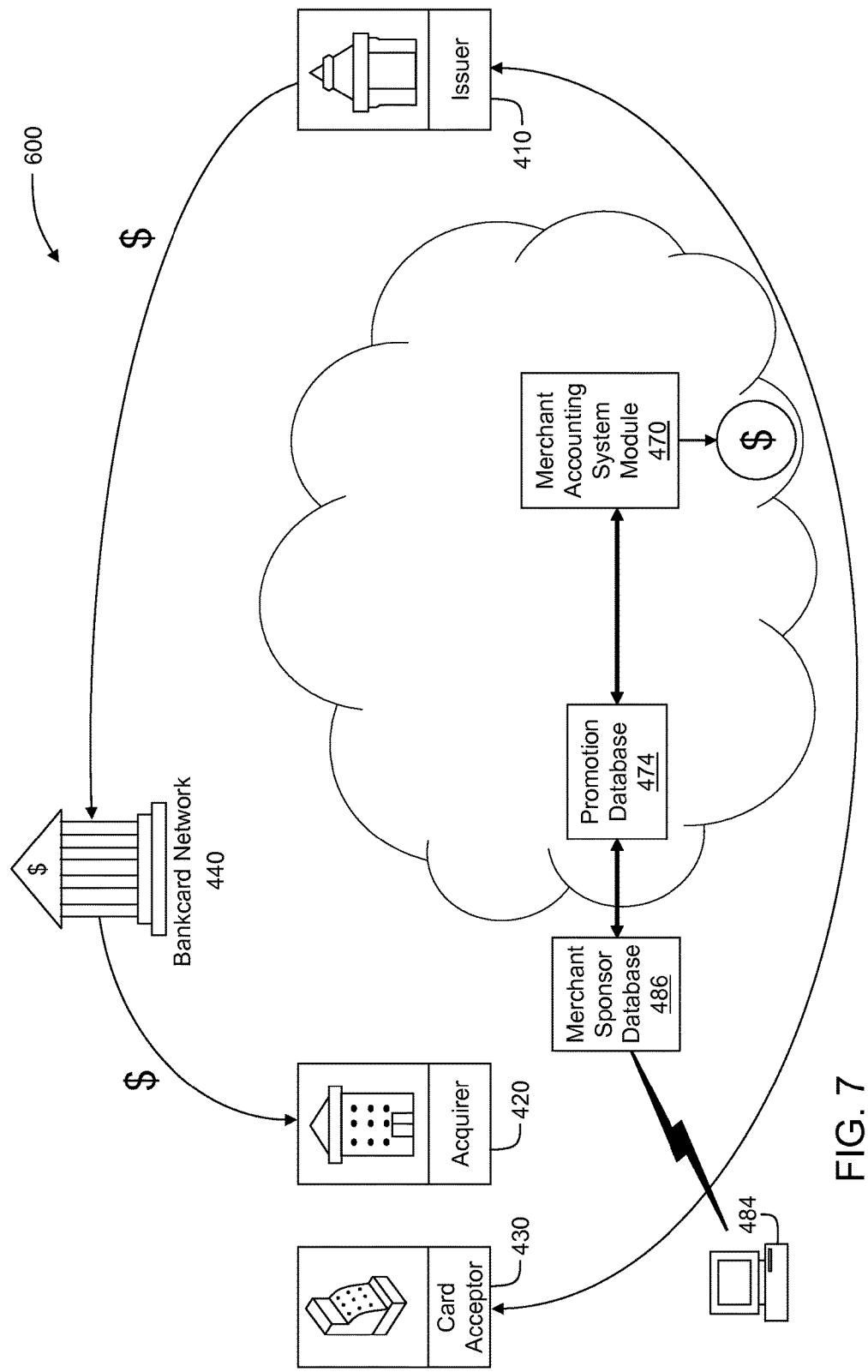
FIG. 7 is a schematic diagram illustrating settlement flows in the exemplary process shown in FIG. 4, in accordance with one embodiment of the present invention.

FIG. 7 is a schematic diagram 600 illustrating settlement flows in the exemplary process shown in FIG. 4, in accordance with one embodiment of the present invention. Bankcard network 440 settles funds with acquirer 420 using standard interchange rates and settlement processes. Similarly, issuer 410 settles funds with bankcard network 440 using standard interchange rates and settlement processes. It is noted that in system 100, merchant accounting system module 470 can create payment files to move debit/credit funds directly between the merchants' and issuer's accounts for the differential amounts or the fees involved in rewards programs or other programs.

More specifically, a transaction is typically settled between the issuer and the interchange network, and then between the interchange network and the merchant bank (also known as the acquirer bank), and then between the merchant bank and the merchant. In addition, in the case where a rewards-based program is sponsored by a sponsor, settlement may also have to occur between the issuer and the sponsor of the discount amount.

Figure 8:
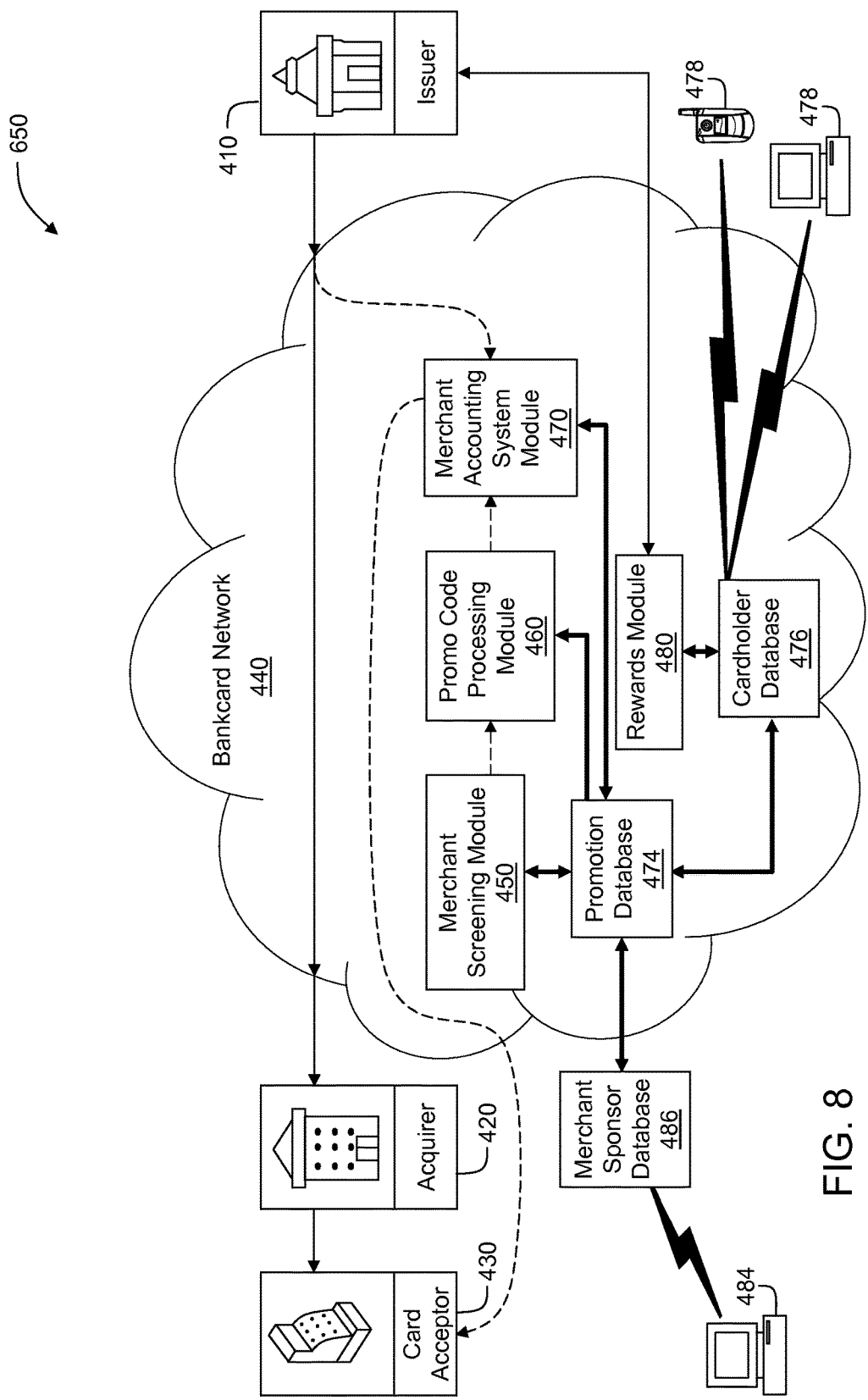
FIG. 8 is a schematic diagram illustrating chargeback and adjustment flows in the exemplary process shown in FIG. 4, in accordance with one embodiment of the present invention.

FIG. 8 is a schematic diagram 650 illustrating chargeback and adjustment flows in the exemplary process shown in FIG. 4, in accordance with one embodiment of the present invention. In system 100, chargebacks and adjustments that conform to standard bankcard policies are processed through existing flow paths with issuer 410 submitting records through the bankcard network 440 to acquirers 420. Similarly, acquirers 420 utilize existing process flow paths back to merchants 430 for chargebacks and adjustments that conform to standard bankcard policies.

However, as shown in FIG. 8, chargebacks and adjustments that have unique properties because of the special relationship between the Issuer 410 and merchants 430 are processed through merchant accounting system module 470. Such chargebacks are processed directly between issuer 410 and merchants 430. The chargebacks can be for an entire amount of the transaction, or strictly for the portion of the chargeback that exceeds standard bankcard policies, as appropriate under specific programs. Similarly, adjustments for any of the special programs are processed directly with the merchant accounts in the same manner, and can be included in the summarized transaction activity used to credit/debit funds and provide reporting. Merchant accounting system module 470 is also configured to communicate with rewards module 480 to credit rewards points when appropriate.

While the present application describes what are believed to be the preferred embodiments of the present invention, those skilled in the art will recognize that further changes and modifications may be made thereto without departing from the spirit of the invention, and it is intended to claim all such changes and modifications that are within the spirit of the invention. For example, in FIGS. 4-8 and the related description merchant screening module 450, promotion code processing module 460, merchant accounting systems module 470, rewards module 480, promotion database 474 and cardholder database 476 are shown as separate modules or units. However, it is readily understood that the structure and functions of these modules can be easily merged in a single module or partitioned into further modules.

It also will be understood that the systems and methods of the present invention can be implemented using any suitable combination of hardware and software. The software (i.e., instructions) for implementing and operating the aforementioned systems and methods can be provided on computer-readable media, which can include without limitation, firmware, memory, storage devices, micro controllers, microprocessors, integrated circuits, ASICS, on-line downloadable media, and other available media.

FIG. 9 is a flowchart 700 illustrating exemplary processes for implementing special or customized issuer-merchant relationships in a payment-by-card system as shown in FIG. 4 and implemented using the system 100 shown in FIG. 2. System 100 prompts a cardholder to select a promotional program offered by a merchant registered with a bankcard network such that promotion codes associated with the selected promotional program are automatically applied to the cardholder's payment transaction with the merchant.

More specifically, the technical effect of the processes and systems described herein is achieved by storing 702 promotion data in a promotion database for merchants participating in the bankcard network including a merchant name, a merchant identification (ID) number, promotion identifiers, transaction qualifications including whether the promotion is a rewards-based promotion, terms of promotions and promotion codes. Rewards data is also stored 704 in a rewards module for rewards program sponsors participating in the bankcard network including a sponsor of each rewards program, a number of accumulated points for each cardholder, and rules for tracking the accumulation and redemption of rewards points. In one embodiment, the promotion data and rewards data may be communicated between the promotion database and the merchant computer. The merchant computer may also include a sponsor computer wherein the sponsor is the party sponsoring the promotional rewards-based program.

In the example embodiment, the system registers 706 the promotion data stored within the promotion database with the merchant accounting system module, and transmits 708 the promotion data to a cardholder database. The cardholder database is accessible by a plurality of cardholders using remote input devices such a personal computer, PDA, cellular phone or a point of sale device at the merchant. The promotion data stored in the promotion database includes a displayable list of available promotions for each cardholder including rewards-based promotions and non-rewards based promotions. Before displaying the list of available promotions, the system determines 710 the number of rewards points already accumulated by the cardholder and then only displays those promotions wherein the cardholder has a sufficient number of accumulated rewards points to satisfy the promotion.

The cardholder then selects 712 at least one promotion from the list of available promotions using an input device. The selected promotion data is communicated from the cardholder database to the merchant screening module.

After selecting 712, cardholder database creates a rewards debit entry to be applied to the accumulated rewards points. After receiving 714 the selected promotion data at the merchant screening module including the associated transaction codes and transaction qualifications, the promotion codes associated with the selected promotion data are transmitted 716 to the promotion code processing module for application to a payment transaction satisfying the transaction qualifications.

Once the cardholder then initiates 718 a purchase transaction from the merchant using a payment card over the bankcard network, the merchant screening module interrogates 720 the authorization for the transaction to determine whether the transacting merchant and issuer have a relationship that corresponds to a registered program which covers the transaction and whether the cardholder has registered for a promotion that covers the transaction.

At the merchant screening module, the system determines whether the cardholder has registered for a promotional program. If the cardholder has not registered for a promotional program, the system may bypass the promotion code processing module and continue with the authorization process. If, however, the merchant screening module determines that the cardholder has registered for a promotional program, the system directs the transaction to the promotion code processing module for validation including determining whether the transaction is validated as covered or, conversely, designated as not covered by a registered program and if covered, may optionally apply the promotion code on the authorization request forwarded to the issuer. The validation may involve the use of suitable algorithms to apply a specific set of criteria which define the relationship or program. The specific set of criteria may, for example, include transaction parameters such as the merchant type and identity, the cardholder identity, the nature of the transacted goods or services, and the location, time and dollar value of the transaction.

Specifically, the promotion code processing module determines 722 whether the authorization of the payment transaction satisfies the transaction qualifications. If the promotion code processing module validates the transaction, the cardholder database receives 724 a notification that the selected rewards-based promotion transaction has been validated, and the promotion code processing module applies 726 the promotion codes to the transaction and forwards 728 the authorization request to the issuer.

During the clearing process, the clearing for the transaction is submitted 730 by the merchant into the bankcard network. The clearing for the transaction is interrogated 732 at the merchant screening module to determine if the cardholder has registered for a promotional program. If so, the merchant screening module forwards the transaction to the promotion code processing module for additional processing, including applying 734 promotion codes and further processing in the merchant accounting system module. The cardholder database transmits 736 the rewards debit entry to the rewards platform for recording. The system also forwards 738 the clearing for the transaction with promotion codes to the issuer.

For the case where the transaction qualifies for special pricing, merchant accounting system module calculates the differential between the special pricing for the specific transaction under the program and the standard pricing of a normal bankcard transaction (i.e., which is not covered by the program). The merchant accounting system module also summarizes transaction activity by a number of configurable variables, to report adjustments to the issuer's interchange, to generate payment files to credit or debit merchants' and/or a third party's accounts on behalf of the issuer for the differential, and to provide miscellaneous reports to the issuer, third party, and merchants to facilitate reconcilement. In addition, for the case where the transaction involves a rewards point redemption, rewards platform posts confirmed rewards points redemptions to the cardholder's rewards program account and generates adjustment records for any immediate effect of the redemption on the cardholder's account with the issuer, for example to reflect rebates obtained by the cardholder directly from the issuer in exchange for redeeming rewards points.

While the invention has been described in terms of various specific embodiments, those skilled in the art will recognize that the invention can be practiced with modification within the spirit and scope of the claims.

What is claimed is:

1. A method for applying promotion codes to a payment transaction using at least one point of sale (POS) device, the payment transaction including a purchase made by a cardholder from a card acceptor using a payment card over a payment card network, said method is performed by a payment card network server computing device communicatively coupled to a database and associated with the payment card network, the payment card network server computing device including a promotion code processing module and a merchant screening module, said method comprising the steps of:

storing, by the payment card network server computing device, promotion data within the database, the promotion data including at least one merchant participating in the payment card network, a plurality of promotional programs offered by the at least one merchant to the cardholder, a respective qualifying number of rewards points required to redeem each of the plurality of promotional programs, and promotion codes associated with each of the plurality of promotional programs, wherein the at least one merchant includes the card acceptor;

storing, by the payment card network server computing device, rewards data within the database including a current number of rewards points accumulated by the cardholder as part of the rewards program;

receiving, by the payment card network server computing device, a rewards request data message from the POS device, wherein the rewards request data message includes at least one account identifier for an account of the cardholder;

performing, by the payment card network server computing device, a lookup in the database for the current number of rewards points accumulated by the cardholder using the at least one account identifier;

identifying, by the promotion code processing module, a subset of the plurality of promotional programs for which the current number of rewards points accumulated by the cardholder exceeds the respective qualifying number of rewards points;

prior to receiving an authorization request via the payment card network for the payment transaction, causing, by the payment card network server computing device, to be displayed on the POS device, solely promotional programs of the plurality of promotional programs that are in the subset;

prior to receiving the authorization request and after causing the subset of promotional programs to be displayed on the POS device, receiving, by the payment card network server computing device, an input identifying a promotional program selected from the subset of promotional programs by the cardholder using the at least one POS device;

transmitting, by the payment card network server computing device, the promotion code associated with the selected promotional program to the promotion code processing module;

receiving, by the payment card network server computing device, the authorization request for the payment transaction via the payment card network;

routing, by the payment card network server computing device, the authorization request to the merchant screening module;

determining, by the merchant screening module, that the cardholder is associated with the authorization request and that the cardholder is registered for the plurality of promotional programs;

transmitting transaction data associated with the authorization request to the promotion code processing module;

validating, by the promotion code processing module using the transaction data and the promotion code associated with the selected promotional program, that the selected promotional program applies to the payment transaction; and automatically applying, using the promotion code processing module, the promotion code associated with the selected promotional program to the payment transaction.

2. A method according to claim 1 further comprising:

deducting the qualifying number of rewards points from the current number of rewards points accumulated by the cardholder;

generating accounting entries representing a rebate to the cardholder for participating in the rewards program; and transmitting the accounting entries to the issuer associated with the cardholder.

3. A method according to claim 1 wherein storing promotion data further comprises storing promotion data within the database for a plurality of merchants participating in the payment card network, the promotion data including at least one of a merchant name, a merchant identification (ID) number, promotion identifiers, transaction qualifications including rewards-based qualifications, terms of promotions, and promotion codes.

4. A method according to claim 1 wherein storing promotion data further comprises storing promotion data within the database associated with available non-rewards programs being offered to the cardholder by at least one of a merchant and an issuer, and wherein the method further comprises causing, by the payment card network server computing device, the non-rewards programs to be displayed on the POS device along with solely promotional programs of the plurality of promotional programs that are in the subset.

5. A method according to claim 1 wherein receiving a selected promotional program further comprises:
displaying on the at least one POS device a list of the plurality of promotional programs being offered by the at least one merchant to the cardholder and the current number of rewards points accumulated by the cardholder as part of the rewards program, wherein the at least one POS device including at least one of a computer system, a cellular telephone, a person digital assistant and a point of sale device associated with the merchant;
receiving a selected promotional program included within the displayed list; and
storing selection data in the database, wherein the selection data represents the selected promotional program.

6. A method according to claim 1 wherein causing the subset of promotional programs to be displayed on the POS device further comprises:
pushing promotion data from the payment card network server computing device to the at least one POS device including the current number of rewards points accumulated by the cardholder as part of the rewards program.

7. A method according to claim 1 wherein automatically applying the promotion codes further comprises:
processing, by the payment card network server computing device, the payment transaction initiated by the cardholder with the payment card;
validating, by the payment card network server computing device, that the payment transaction satisfies transaction qualifications associated with the selected promotional program; and
applying, by the payment card network server computing device, the promotion codes associated with the selected promotional program to the validated payment transaction such that terms of the selected promotional program are applied to the payment transaction of the cardholder.

8. A method according to claim 1 wherein automatically applying the promotion codes further comprises:
interrogating the payment transaction by the payment card network server computing device to determine whether the payment transaction satisfies transaction qualifications associated with the selected promotional program;
applying, by the payment card network server computing device, the promotion codes associated with the selected promotional program to the payment transaction if the transaction qualifications are satisfied; and
generating, by the payment card network server computing device, accounting entries associated with the payment transaction including at least one of crediting and debiting merchant and issuer accounts, and at least one of crediting and debiting rewards program accounts with the merchant and the issuer, further comprising applying the accounting entries to the merchant and issuer accounts to represent at least one of a credit or debit due to the promotion code.

9. A method according to claim 1, further comprising:
calculating an amount of fees to be charged to the merchant for participating in the selected promotional program applied to the payment transaction; and
generating accounting entries representing the payment transaction including terms of the selected promotional program applied to the payment transaction and the calculated amount of fees, and transmitting the accounting entries to the merchant associated with the selected promotional program and issuer associated with the cardholder.

10. A method according to claim 1, further comprising:
transmitting payment of the payment transaction;
calculating an amount of fees to be charged to the merchant for participating in the selected promotional program applied to the payment transaction; and
subsequent to transmitting payment of the payment transaction, transmitting debit or credit funds directly between an account of the merchant and an account of the issuer, the debit or credit funds including the calculated amount of fees for the selected promotional program.

11. A network-based system for applying processing codes to a payment transaction including a purchase made by a cardholder from a card acceptor using a payment card over a payment card network, said system comprising:
a database for storing information; and
a payment card network server computing device associated with the payment card network, said payment card network server computing device is configured to be coupled to a point of sale (POS) device and said database, said payment card network server computing device including a promotion code processing module and a merchant screening module, said payment card network server computing device further configured to:
store promotional data within the database including at least one merchant participating in the payment card network, a plurality of promotional programs offered by the at least one merchant to the cardholder, a respective qualifying number of rewards points required to redeem each of the plurality of promotional programs, and promotion codes associated with each of the plurality of promotional programs offered to the cardholder, wherein the at least one merchant includes the card acceptor;
receive rewards data including a current number of rewards points accumulated by the cardholder as part of the rewards program;
receive a rewards request data message from the POS device, wherein the rewards request data message includes at least one account identifier for an account of the cardholder;
perform a lookup in the database for the current number of rewards points accumulated by the cardholder using the at least one account identifier;
identify, by the promotion code processing module, a subset of the plurality of promotional programs for which the current number of rewards points accumulated by the cardholder exceeds the respective qualifying number of rewards points;
prior to receiving an authorization request via the payment card network for the payment transaction, cause to be displayed on the POS device solely promotional programs of the plurality of promotional programs that are in the subset;
prior to receiving the authorization request and after causing the subset of promotional programs to be displayed on the POS device, receive selection data from the POS device, the selection data identifying a promotional program selected by the cardholder at the POS device from the subset of promotional programs;

transmit the promotion code associated with the selected promotional program to the promotion code processing module;

receive the authorization request for the payment transaction via the payment card network;

route the authorization request to the merchant screening module;

determine, by the merchant screening module, that the cardholder is associated with the authorization request and that the cardholder is registered for the plurality of promotional programs;

transmit transaction data associated with the authorization request to the promotion code processing module; and validate, by the promotion code processing module using the transaction data and the promotion code associated with the selected promotional program, that the selected promotional program applies to the payment transaction; and automatically apply, using the promotion code processing module, the promotion code associated with the selected promotional program to the payment transaction.

12. A system according to claim 11 wherein the promotion data comprises at least one of a merchant name, a merchant identification (ID) number, promotion identifiers, transaction qualifications including rewards-based qualifications, terms of promotions, and promotion codes.

13. A system according to claim 11 wherein the promotion data further comprises a list of available non-rewards programs being offered to each cardholder by at least one of a merchant and an issuer, said payment card network server computing device further configured to cause the non-rewards programs to be displayed on the POS device along with solely promotional programs of the plurality of promotional programs that are in the subset.

14. A system according to claim 11 wherein the payment card network server computing device is further configured to
push the promotion data to the POS device to display the current number of rewards points accumulated by the cardholder as part of the rewards program.

15. A system according to claim 11 wherein the payment card network server computing device is further configured to:
store transaction qualifications within the database, wherein the transaction qualifications include terms a payment transaction must include for a corresponding promotional program to be applicable;
validate the payment transaction initiated by the cardholder with the payment card, wherein the validation comprises determining whether the payment transaction satisfies the transaction qualifications associated with the selected promotional program; and
apply the promotion codes associated with the selected promotional program to the validated payment transaction such that terms of the selected promotional program are applied to the payment transaction of the cardholder.

16. A system according to claim 11 wherein the payment card network server computing device is further configured to:
interrogate the payment transaction initiated by the cardholder to determine whether the payment transaction satisfies transaction qualifications associated with the selected promotional program;
apply the promotion codes associated with the selected promotional program to the payment transaction if the transaction qualifications are satisfied; and
generate accounting entries associated with the payment transaction including at least one of crediting and debiting merchant and issuer accounts, and at least one of crediting and debiting rewards program accounts with the merchant and the issuer, wherein the accounting entries reflect the promotion code being applied to the merchant and issuer accounts.

17. A system according to claim 11 wherein the payment card network server computing device is further configured to:
transmit payment of the payment transaction;
calculate an amount of fees to be charged to the merchant for participating in the selected promotional program applied to the payment transaction; and
subsequent to transmitting payment of the payment transaction, transmit debit or credit funds directly between an account of the merchant and an account of the issuer, the debit or credit funds including the calculated amount of fees for the selected promotional program.

18. A payment card network server computing device coupled to a database for applying processing codes to a payment transaction performed by a cardholder from a card acceptor using a payment card over a payment card network, said payment card network server computing device includes a promotion code processing module and a merchant screening module, said payment card network server computing device is associated with the payment card network and is in communication with an POS device, wherein
the database stores promotional data including each merchant participating in the payment card network, a plurality of promotional programs offered by each merchant to the cardholder, a respective qualifying number of rewards points required to redeem each of the plurality of promotional programs, and promotion codes associated with each of the plurality of promotional programs offered to the cardholder, wherein the at least one merchant includes the card acceptor;
the database further stores rewards data including a current number of rewards points accumulated by the cardholder as part of the rewards program; and
said payment card network server computing device receives a rewards request data message from the POS device, wherein the rewards request data message includes at least one account identifier for an account of the cardholder;
said payment card network server computing device performs a lookup in the database for the current number of rewards points accumulated by the cardholder using the at least one account identifier;
said payment card network server computing device identifies, using the promotion code processing module, a subset of the plurality of promotional programs for which the current number of rewards points accumulated by the cardholder exceeds the respective qualifying number of rewards points;
prior to receiving an authorization request via the payment card network for the payment transaction, said payment card network server computing device causes to be displayed on the POS device, solely promotional programs of the plurality of promotional programs that are in the subset, said payment card network server computing device is further programmed to:

prior to receiving the authorization request and after causing the subset of promotional programs to be displayed on the POS device, said payment card network server computing device receives selection data from the POS device, the selection data representing a promotional program selected by the cardholder at the POS device from the subset of promotional programs for application to the payment transaction to be initiated by the cardholder with the merchant offering the selected promotional program;

said payment card network server computing device transmits the promotion code associated with the selected promotional program to the promotion code processing module;

said payment card network server computing device receives the authorization request for the payment transaction via the payment card network;

said payment card network server computing device routes the authorization request to the merchant screening module;

said merchant screening module determines that the cardholder is associated with the authorization request and that the cardholder is registered for the plurality of promotional programs;

transmit transaction data associated with the authorization request to the promotion code processing module;

said promotion code processing module validates, using the transaction data and the promotion code associated with the selected promotional program, that the selected promotional program applies to the payment transaction; and automatically apply, using the promotion code processing module, the promotion code associated with the selected promotional program to the payment transaction.

19. A payment card network server computing device according to claim 18 wherein said payment card network server computing device causes non-rewards programs to be displayed on the POS device along with solely promotional programs of the plurality of promotional programs that are in the subset.

20. A payment card network server computing device according to claim 18 further comprising:
a merchant screening module programmed to process the payment transaction initiated by the cardholder with the payment card, and determine whether the cardholder has selected a promotional program; and
a promotion code processing module programmed to validate the payment transaction including determining whether the payment transaction satisfies transaction qualifications associated with the selected promotional program and apply the promotion codes associated with the selected promotional program to the validated payment transaction such that terms of the selected promotional program are applied to the payment transaction of the cardholder.

21. A payment card network server computing device according to claim 18 further programmed to:
interrogate the payment transaction initiated by the cardholder to determine whether the payment transaction satisfies transaction qualifications associated with the selected promotional program;
apply the promotion codes associated with the selected promotional program to the payment transaction if the transaction qualifications are satisfied; and
generate accounting entries associated with the payment transaction including at least one of crediting and debiting funds between merchant and issuer accounts, wherein the accounting entries reflect the promotion code being applied to the merchant and issuer accounts.

22. One or more non-transitory computer-readable storage media having computer-executable instructions embodied thereon for applying processing codes to a payment transaction including a purchase made by a cardholder from a card acceptor using a payment card over a payment card network, wherein when executed by at least one processor in a payment card network server computing device associated with the payment card network, the computer-executable instructions cause the at least one payment card network server computing device to:
store within a database promotion data including at least one merchant participating in the payment card network, a plurality of promotional offered by the at least one merchant to the cardholder, a respective qualifying number of rewards points required to redeem each of the plurality of promotional programs, and promotion codes associated with each of the plurality of promotional programs offered to the cardholder, wherein the at least one merchant includes the card acceptor;
store within the database rewards data including a current number of rewards points accumulated by the cardholder as part of the rewards program;
receive a rewards request data message from an POS device, wherein the rewards request data message includes at least one account identifier for an account of the cardholder;
perform a lookup in the database for the current number of rewards points accumulated by the cardholder using the at least one account identifier;
identify a subset of the plurality of promotional programs for which the current number of rewards points accumulated by the cardholder exceeds the respective qualifying number of rewards points;
prior to receiving an authorization request via the payment card network for the payment transaction, cause to be displayed on the POS device solely promotional programs of the plurality of promotional programs that are in the subset;
prior to receiving the authorization request and after displaying the subset of promotional programs on the POS device, receive selection data from the at least one POS device, the selection data representing a promotional program selected by the cardholder at the at least one POS device from the subset to be applied to the payment transaction;
transmit the promotion code associated with the selected promotional program to a promotion code processing module of the at least one payment card network server computing device;
receive the authorization request for the payment transaction via the payment card network;
route the authorization request to a merchant screening module of the at least one payment card network server computing device;
determine, by the merchant screening module, that the cardholder is associated with the authorization request and that the cardholder is registered for the plurality of promotional programs;
transmit transaction data associated with the authorization request to the promotion code processing module;
validate, by the promotion code processing module using the transaction data and the promotion code associated with the selected promotional program, that the selected promotional program applies to the payment transaction; and apply the promotion code associated with the selected promotional program to the payment transaction initiated by the cardholder.

23. One or more non-transitory computer-readable storage media in accordance with claim 22 further comprising computer-executable instructions that cause the payment card network server computing device to:

transmit to the POS device the current number of rewards points accumulated by the cardholder as part of the rewards program;

receive a selected promotional program from the displayed list; and store selection data in the database, wherein the selection data represents the promotional program selected by the cardholder.

24. One or more non-transitory computer-readable storage media in accordance with claim 22 further comprising computer-executable instructions that cause the payment card network server computing device to:

push promotion data to the at least one POS device including the current number of rewards points accumulated by the cardholder as part of the rewards program.

25. One or more non-transitory computer-readable storage media in accordance with claim 22 further comprising computer-executable instructions that cause the payment card network server computing device to:

process the payment transaction initiated by the cardholder with the payment card;

validate the payment transaction including confirming that the payment transaction satisfies transaction qualifications associated with the selected promotional program; and apply the promotion codes associated with the selected promotional program to the validated payment transaction such that terms of the selected promotional program are applied to the payment transaction of the cardholder.

26. One or more non-transitory computer-readable storage media in accordance with claim 22 further comprising computer-executable instructions that cause the payment card network server computing device to:

interrogate the payment transaction initiated by the cardholder to determine whether the payment transaction satisfies transaction qualifications associated with the selected promotional program;

apply the promotion codes associated with the selected promotional program to the payment transaction if the transaction qualifications are satisfied; and generate accounting entries associated with the payment transaction including at least one of crediting and debiting funds between merchant and issuer accounts, wherein the accounting entries reflect the promotion code being applied to the merchant and issuer accounts.

* * * * *

UNITED STATES PATENT AND TRADEMARK OFFICE
CERTIFICATE OF CORRECTION

PATENT NO.        : 10,262,303 B2
APPLICATION NO.   : 11/966803
DATED             : April 16, 2019
INVENTOR(S)       : Powell Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1581 days.

Signed and Sealed this
Seventeenth Day of March, 2020

Andrei Iancu
*Director of the United States Patent and Trademark Office*